US008271432B2

(12) United States Patent
D'Ambrosio et al.

(10) Patent No.: US 8,271,432 B2
(45) Date of Patent: Sep. 18, 2012

(54) COMMUNITY-DRIVEN RELATIONAL FILTERING OF UNSTRUCTURED TEXT

(75) Inventors: Bruce D'Ambrosio, Seattle, WA (US); Stephen Jensen, Corvallis, OR (US)

(73) Assignee: Oracle OTC Subsidiary LLC, Redwood Shores, CA (US)

( * ) Notice: Subject to any disclaimer, the term of this patent is extended or adjusted under 35 U.S.C. 154(b) by 533 days.

(21) Appl. No.: 12/498,764

(22) Filed: Jul. 7, 2009

(65) Prior Publication Data

US 2011/0010331 A1    Jan. 13, 2011

(51) Int. Cl.
  *G06F 7/00*    (2006.01)
(52) U.S. Cl. ........................................ 707/607; 707/751
(58) Field of Classification Search .................. 707/736, 707/737, 711, 738, 607, 751
See application file for complete search history.

(56) References Cited

U.S. PATENT DOCUMENTS

| | | | |
|---|---|---|---|
| 6,266,649 B1 * | 7/2001 | Linden et al. ................ | 705/7.29 |
| 7,376,649 B2 * | 5/2008 | Yang et al. .................... | 707/738 |
| 8,032,507 B1 * | 10/2011 | Bayardo et al. ............... | 707/706 |
| 2002/0010625 A1 * | 1/2002 | Smith et al. ..................... | 705/14 |
| 2003/0065562 A1 | 4/2003 | Matsui et al. | |
| 2004/0230440 A1 | 11/2004 | Malhotra | |
| 2007/0271286 A1 * | 11/2007 | Purang et al. ................. | 707/101 |

OTHER PUBLICATIONS

Liu et al., "A Framework for Personalized E-Catalogs: an Integration of XML-based Metadata, User Models and Agents", 2001, Proceedings of the 34th Hawaii International Conference on System Sciences, pp. 1-10.*
Lee et al., "Practical Issues for Building a Product Ontology System", 2005, Proceedings of the 2005 International Workshop on Data Engineering Issues in E-Commerce, IEEE, pp. 1-10.*
International Search Report application No. PCT/US2010/040751 dated Feb. 14, 2011.
Hohman, E., "A Dynamic Graph Model for Representing Streaming Text Documents," A Dissertation, Spring Semester 2008, pp. 1-141, George Mason University, Fairfax, VA.
Hyvärinen, A, et al., "Independent Component Analysis: Algorithms and Applications," Neural Networks Research Centre, 2000, pp. 411-430, 13(4-5), Helsinki University of Technology, Finland.
Croft, W.B., et al., "Using Probabilistic Models of Document Retrieval Without Relevance Information," Journal of Documentation, Dec. 1979, pp. 285-295, vol. 35, No. 4.

* cited by examiner

*Primary Examiner* — Rehana Perveen
*Assistant Examiner* — Hung Havan
(74) *Attorney, Agent, or Firm* — Squire Sanders (US) LLP

(57) ABSTRACT

A method and apparatus for calculating a score for word selection, which may be used to preprocess sets of words prior to a dimensionality reduction process, employs information about relationships between words themselves (such as synonym relationships) or relationships between items with which the words are associated (such as products in a catalog). In some embodiments, the relationships are also community based; i.e., the relationships are established by a community of users. The relationships may be references to two or more word sets in which the word of interest is common. In one embodiment, the word sets are descriptions of products in an online catalog, the community is the group of people who view the catalog, and the relationships used for calculating the score for a particular word of interest are coreferences (e.g., viewing or purchasing) of pairs of products for which the catalog descriptions both include the particular word.

20 Claims, 3 Drawing Sheets

COMMUNITY-DRIVEN RELATIONAL FILTERING OF UNSTRUCTURED TEXT

FIELD

The present disclosure concerns an improved word filtering technique which may be used to filter a document set prior to a dimensionality-reduction process.

BACKGROUND

Statistical techniques for dimensionality-reduction, such as independent component analysis (ICA), have been shown to be effective in embedding large sets of documents in low-dimensional spaces both for classification and for similarity-based retrieval. These dimensionality-reduction techniques have been applied to retail product catalog "understanding," where the unstructured text items can include such information as product name and description.

One standard technique for improving the performance of such dimensionality-reduction methods is to preprocess the set of words associated with each item. Preprocessing (also sometimes known as normalization) is typically accomplished by first removing very common words (e.g., "an", "the", etc.), and then applying techniques such as stemming (i.e., removing suffixes and prefixes from words to expose common root forms) or truncation, and/or down-selection to a "relevant" subset of the vocabulary. Down-selection is also known as word filtering or word selection. It should be understood that some or all of the aforementioned preprocessing techniques (common word removal, stemming, truncation, and word filtering) may be used in any particular application. After word selection, each document in the set (e.g., each product description in a catalog) is converted into a vector of counts. The vectors are combined into a matrix of descriptions and counts that is then reduced using some dimensionality reduction scheme such as ICA.

Traditional statistical methods for word selection use catalog-based relevance measures, such as removing all words appearing in most or few of the items. An alternate approach to word selection is described herein.

SUMMARY

Alternate approaches to word selection are described in further detail herein. These approaches differ from traditional statistical methods in one or both of two ways:

1. They are relational. That is, the information used is about relationships, such as relationships between product pairs or descriptions of pairs of products, not word occurrence in individual products; and 2. They are community-based. That is, the information is about product coreference (e.g., co-view or co-buy) by visitors to a website on which the catalog is hosted. Thus, the filter incorporates the community view of product relatedness into the dimensionality reduction process.

Testing has shown that this approach outperforms any of the more sophisticated (but non-relational, not community-driven) methods traditionally used. The use of relational information is, in general, transformative, and widely applicable wherever traditional non-relational, purely catalog-based, methods have been used in the past (e.g., search).

DETAILED DESCRIPTION

Figure 1:
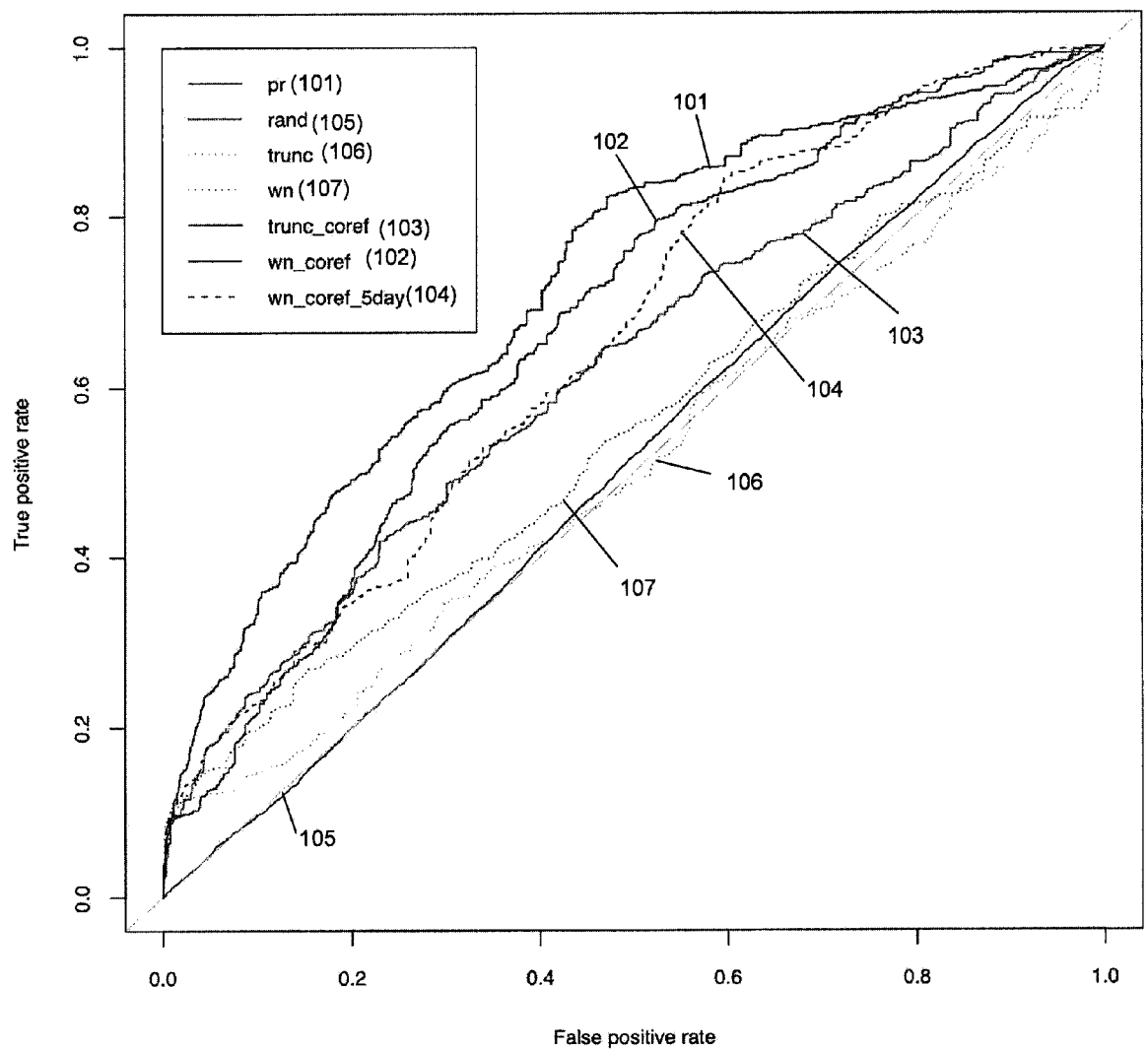
FIG. 1 is a set of receiver operating characteristic curves showing experimental results for various embodiments.

In the following detailed description, a plurality of specific details, such as particular constants used in various equations and types of coreference data, are set forth in order to provide a thorough understanding of the preferred embodiments discussed below. The details discussed in connection with the preferred embodiments should not be understood to limit the present invention. Furthermore, for ease of understanding, certain method steps are delineated as separate steps; however, these steps should not be construed as necessarily distinct nor order dependent in their performance.

The word selection techniques described herein can be used with a wide variety of document sets that are to be embedded into low dimensional spaces, whether for classification or similarity-based retrieval. These word selection techniques may be used to preprocess a document set for a wide variety of dimensionality-reduction techniques, including but not limited to ICA, PCA (principal component analysis), and SVD (singular value decomposition). It should be understood that the current invention covers word selection techniques that are relational, including community-based and other forms of relational techniques such as semantic-based (e.g., use of synonym/antonym information) methods and methods in which relationship in indicated by information found in a catalog (e.g., common manufacturer.

The word selection techniques described herein are believed to be particularly applicable to the retail catalog environment and particularly the web hosted retail catalog environment and therefore will be discussed primarily in that context herein. However, the invention should not be understood to be so limited and may be used with a wide variety of documents in both electronic (web based and other) and hard copy forms.

One embodiment of relational word selection uses product-to-product relations from a coreference record to determine what words in product descriptions help to explain the existence and strength of the coreference. The coreference record is a record of the pairwise coreference frequency of items. Coreference may be measured, for example, with respect to web user sessions (e.g., how may times a user of a web based catalog who viewed or bought one item of a pair also viewed or bought the second item of a pair in the same web session) or any other independent source of term coreference.

In some embodiments, the coreference record is maintained as an $N \times N$ array, where N is the number of products in the catalog. In other embodiments, the coreference record is maintained as five disjoint maximal weighted spanning trees rather than the full $N \times N$ array. The storage requirements for the five disjoint maximal weighted spanning trees grows linearly rather than quadratically. The maximal weighted spanning trees are created by processing the raw reference stream (e.g., the session logs in a web catalog embodiment) and reducing down to the spanning tree representation whenever the coreference table size exceeds a threshold. Each entry in the record (whether array or tree) is a weight. In some embodiments, the weight represents a count of coreferences, such as a count of the number of visitors in the sample who referenced both products. The count may be accumulated over a specific time period. In some embodiments, the coreference weights are decayed based on their age and then new coreference weights are added to the decayed values to obtain the new coreference weights. In other embodiments, the count may be accumulated over a specific total number of users who visit the catalog. In yet other embodiments, the weight represents a fraction of viewers who reference the product pair.

Below is a description of one embodiment applicable to a web catalog environment. The constants in the equations below were derived empirically.

DEFINITIONS $n_w$: Number of unique words in a catalog (across all products) after stemming or truncation
$n_p$: Number of products in a catalog
$c_i$: Number of times word i appears in the catalog (across all products)
$w_i$: Number of products in which word i appears
$B_i$: sum across all products of coreference weights when word i appears in the catalog entry for both coreferenced products
$S_i$: sum across all products of coreference weights when word i appears in the catalog entry for one coreferenced product Coreference weights are $\geq 0$.

Using the above definitions, words are scored based on two derived values:
$L_i = (B_i + 0.1)/(S_i + 3.0)$ $$I_i = 2 * \sqrt{\frac{p}{1-p}}$$

where $p = w_i/n_p$

The word score of word i is then
$Score_i$: $1e^5 * L_i * I_i * f_i$
where
$f_i = \max[\sqrt{B_i} * (L_i - 0.2)]$ The number of words used is limited to the top scoring N words, where
$N = \max[\min[300, n_w], 25 * \sqrt{n_p}]$ The score function is constructed to favor words that are likely to appear in a given product (through $I_i$) and are correlated with coreferences (through $L_i$, which is the ratio of (1) the sum over all products of the coreference weights of product pairs in which the word appears in the catalog entry for both products to (2) the sum over all products of the coreference weights of product pairs in which the word appears in only one product of the pair). The score function strongly penalizes words that tend to only appear in one side of a coreference. In this way, words that "explain" strong coreferences are chosen for use in the recommendation model.

Exemplary Implementation 1

Implementation of the embodiment described above will be discussed relative to a simplified retail catalog and coreference data set for the purposes of illustration. In this example, the retail clothing catalog includes three products: A, B and C. The description in the catalog for product A includes the words shirt, long, sleeve, plaid. The description in the catalog for product B includes the words shirt, short, sleeve, stripe. The catalog description for product C includes the words pants, cuff, stripe.

There is product coreference data corresponding to ten user web sessions. In session 1, the user looked at viewed only products A and B. In session 2, the user viewed products B and C. In session 3, the user viewed only product B. In session 4, the user viewed products A and B and C. In session 5, the user viewed products B and C. In sessions 6, 7, and 8, the user viewed products B and C. In session 9, the user viewed only product C. In session 10, the user viewed products A, B and C.

The number of words $n_w = 8$ (shirt, long, sleeve, stripe, short, plaid, pants, cuff) and the number of products $n_p = 3$ (products A, B and C). The number of times each of these words appears in the catalog, $c_i$, is as follows: $C_{shirt} = 2$; $c_{long} = 1$; $C_{sleeve} = 2$; $c_{stripe} = 2$, $c_{short} = 1$; $c_{plaid} = 1$; $c_{pant} = 1$; $c_{cuff} = 1$. The number of products in which each word appears, $w_i$, is as follows: $w_{shirt} = 2$; $w_{long} = 1$; $w_{sleeve} = 2$; $w_{stripe} = 2$, $w_{short} = 1$; $w_{plaid} = 1$; $w_{pants} = 1$; $w_{cuff} = 1$. The array of coreference weights (the count of the number of users who referenced each product in the pair) is constructed as follows:

|   | A | B | C |
|---|---|---|---|
| A | x | 3 | 2 |
| B | 3 | x | 7 |
| C | 2 | 7 | x |

The coreference array above is symmetric—it includes redundant information in that the row, column entries are the same as the column, row entries (i.e., the entry for column A, row C is the same as row A, column C). This is because no information concerning the direction of the coreference (i.e., which product was viewed first) is maintained. Those of skill in the art will recognize that storing the redundant information is not necessary and more efficient storage schemes are well known in the art.

Next, the values of B and S for each of the words is calculated. $B_{shirt}$ = sum across all products of coref weights when word i appears in the catalog entry for both coreferenced products=3. This is because the word "shirt" appears in product A and product B, therefore the AB coreference is the only coreference when the word "shirt" appears in both coreferenced products, so from the array the AB coreference weight is 3. $B_{long}$ is 0 because the word "long" never appears in both coreferenced products for any coreference pair. Similarly, $B_{short}$, $B_{plaid}$, $B_{pants}$ and $B_{cuff}$ are all also 0. $B_{sleeve}$ is 3 because "sleeve" appears in both products A and B in the product AB coreference. Finally, $B_{stripe} = 7$ because the word "stripe" appears twice in only the product BC coreference.

The value of S for the word "shirt" ($S_{shirt}$)=sum across all products of coreference weights when word i appears in the catalog entry for one coreferenced product=9 because "shirt" appears in only once in the AC and BC coreferences, which have weights of 2 and 7, respectively. $S_{long} = 5$ because the word "long" appears only in product A, the coreferences involving product A are the AB and AC coreferences, the AB coreference weight is 3 and the AC coreference weight is 2.

$S_{sleeve} = 9$ for the same reasons as $S_{shirt}$. $S_{stripe} = 5$ because "stripe" appears in products B and C and therefore appears once in the AB and AC coreferences which have weights 3 and 2. $S_{short} = 10$ because "short" appears in only product B, the AB coreference weight is 3 and the BC coreference weight is 7. $S_{plaid}$ is 5 because "plaid" only appears in product A, therefore the coreferences in which "plaid" appears once are AB and AC which have weights of 3 and 2. $S_{pants} = 9$ because "pants" occurs only in product C, the AC coreference weight is 2 and the BC coreference weight is 7. $S_{cuff}$ is also 9 because, like "pants", "cuff" occurs only in product C.

Using the values for $w_i$, $B_i$ and $S_i$ calculated above, the values of $L_i$, $I_i$ and $f_i$ are calculated as follows:

$L_{shirt}=(3+0.1)/(9+3.0)=0.258$  $I_{shirt}=2*\text{sqrt}[(\frac{2}{3})/(1-(\frac{2}{3}))]=2.828$ $L_{long}=(0+0.1)(5+3.0)=0.013$  $I_{long}=2*\text{sqrt}[(\frac{1}{3})/(1-(\frac{1}{3}))]=2.222$ $L_{sleeve}=(3+0.1)/(9+3.0)=0.258$  $I_{sleeve}=2*\text{sqrt}[(\frac{2}{3})/(1-(\frac{2}{3}))]=2.828$ $L_{stripe}=(7+0.1)/(5+3.0)=0.888$  $I_{stripe}=2*\text{sqrt}[(\frac{2}{3})/(1-(\frac{2}{3}))]=2.828$ $L_{short}=(0.0+0.1)/(10+3.0)=0.008$  $I_{short}=2*\text{sqrt}[(\frac{1}{3})/(1-(\frac{1}{3}))]=2.222$ $L_{plaid}=(0.0+0.1)/(5+3.0)=0.013$  $I_{plaid}=2*\text{sqrt}[(\frac{1}{3})/(1-(\frac{1}{3}))]=2.222$ $L_{pants}=(0.0+0.1)/(9+3.0)=0.008$  $I_{pants}=2*\text{sqrt}[(\frac{1}{3})/(1-(\frac{1}{3}))]=2.222$ $L_{cuff}=(0.0+0.1)/(9+3.0)=0.008$  $I_{cuff}=2*\text{sqrt}[(\frac{1}{3})/(1-(\frac{1}{3}))]=2.222$ $f_{shirt}=\max[0,\text{sqrt}(3)*(0.258-0.2)]=0.100$ $f_{long}=\max[0,\text{sqrt}(0)*(0.013-0.2)]=0$ $f_{sleeve}=\max[0,\text{sqrt}(3)*(0.258-0.2)]=0.100$ $f_{stripe}=\max[0,\text{sqrt}(7)*(0.888-0.2)]=1.820$ $f_{short}=\max[0,\text{sqrt}(0)*(0.008-0.2)]=0$ $f_{plaid}=\max[0,\text{sqrt}(0)*(0.0125-0.2)]=0$ $f_{pants}=\max[0,\text{sqrt}(0)*(0.008-0.2)]=0$ $f_{cuff}=\max[0,\text{sqrt}(0)*(0.008-0.2)]=0$ Next, the scores for each word are calculated:

$\text{Score}_{shirt}=1e5*0.258*2.828*0.100=7296$ $\text{Score}_{long}=1e5*0.013*2.222*0=0$ $\text{Score}_{sleeve}=1e5*0.258*2.828*0.100=7296$ $\text{Score}_{stripe}=1e5*0.888*2.828*1.820=457050$ $\text{Score}_{short}=1e5*0.008*2.222*0=0$ $\text{Score}_{plaid}=1e5*0.013*2.222*0=0$ $\text{Score}_{pants}=1e5*0.008*2.222*0=0$ $\text{Score}_{cuff}=1e5*0.008*2.222*0=0$ In this simplified example, the highest scoring words were stripe, sleeve and shirt. Thus, these words would be selected. Normally, there will be many more entries in the catalog and many more words for each entry. Therefore, as discussed above, some predetermined number of the top-scoring words may be selected in such embodiments, or a threshold score may be used to make the selection.

Experiment 1

In this experiment, the effects of coreference-based word selection on checkout prediction were determined. Various word normalization (Porter stemming, wordNet normalization, truncation) methods were also examined both with and without coreference-based word selection.

The prediction model assumes that there is an interaction between the ICA values of products viewed and purchased in a session, and that this interaction ultimately affects the odds of a checkout in the session. Structurally, the model is held constant. Parameters are relearned for each ICA representation. The model is trained using one or five days of data and is tested using the following day's data.

Performance is evaluated by how well the model was able to predict the odds of a checkout given viewed products in a session. The evaluation metric is the area under the ROC (receiver operating characteristic) curve (AUC). Descriptions of the various normalization methods (with and without coreference-based word selection) and AUC values appear below in Table 1. FIG. 1 shows the ROC curves 101-107 from which the AUC values were computed.

TABLE 1

| Model name | Description | AUC |
| --- | --- | --- |
| pr | Current implementation (Porter stemming + coreference selection) | 0.719 |
| wn_coref | WordNet normalization + coreference selection | 0.671 |
| wn_coref_5 day | Same as wn_coref, but using 5 days of training data | 0.650 |
| trunc_coref | Words truncated to first 4 characters + coreference selection | 0.621 |
| wn | WordNet normalization only | 0.546 |
| rand | Random Gaussian values for each product | 0.511 |
| trunk | Words truncated to first 4 characters only | 0.508 |

The results set forth above in Table 1 illustrate that exploiting product-product relations when selecting words can improve checkout prediction performance much more than resorting to more sophisticated word normalization schemes.

Exemplary Implementation 2

The above shows that the use of community-derived relational information for word selection significantly improves the predictive capability of dimensionality reduction. However, for many product-to-product coreferences, a word may appear in one product's description but not in the other's. For example, this might occur due to use of synonyms in the available text, or due to available text emphasizing different aspects of the relevant products. Both products, however, might be connected via coreference to a third product that may contain words from each of the two original products. We can view this as applying a one-step transitive inference across the coreference relation. Below is a method for extending the current coreference-based word selection method to include relations deeper inside the coreference record. The specific method described below can be seen as an instance of a more general n-step inference over the coreference relation.

Additional definitions:

Let A and B be the products in a coreference.

$N_i$: The geometrical mean coreference count between A and B's common neighbors containing word i. A common neighbor is a product C that is a coreferent of both A and B. Note that this can occur even if A and B are not themselves coreferent, if the set of sessions that reference both A and C is disjoint from the set that reference both B and C.

Then adjust the definition of $L_i$ above to be:

$L_i=(B_i+\sqrt{N_i}+0.1)/(S_i+3.0)$

The scoring function now favors words that appear in products that coreference the products in the current coreference.

Experiment 2

Figure 2:
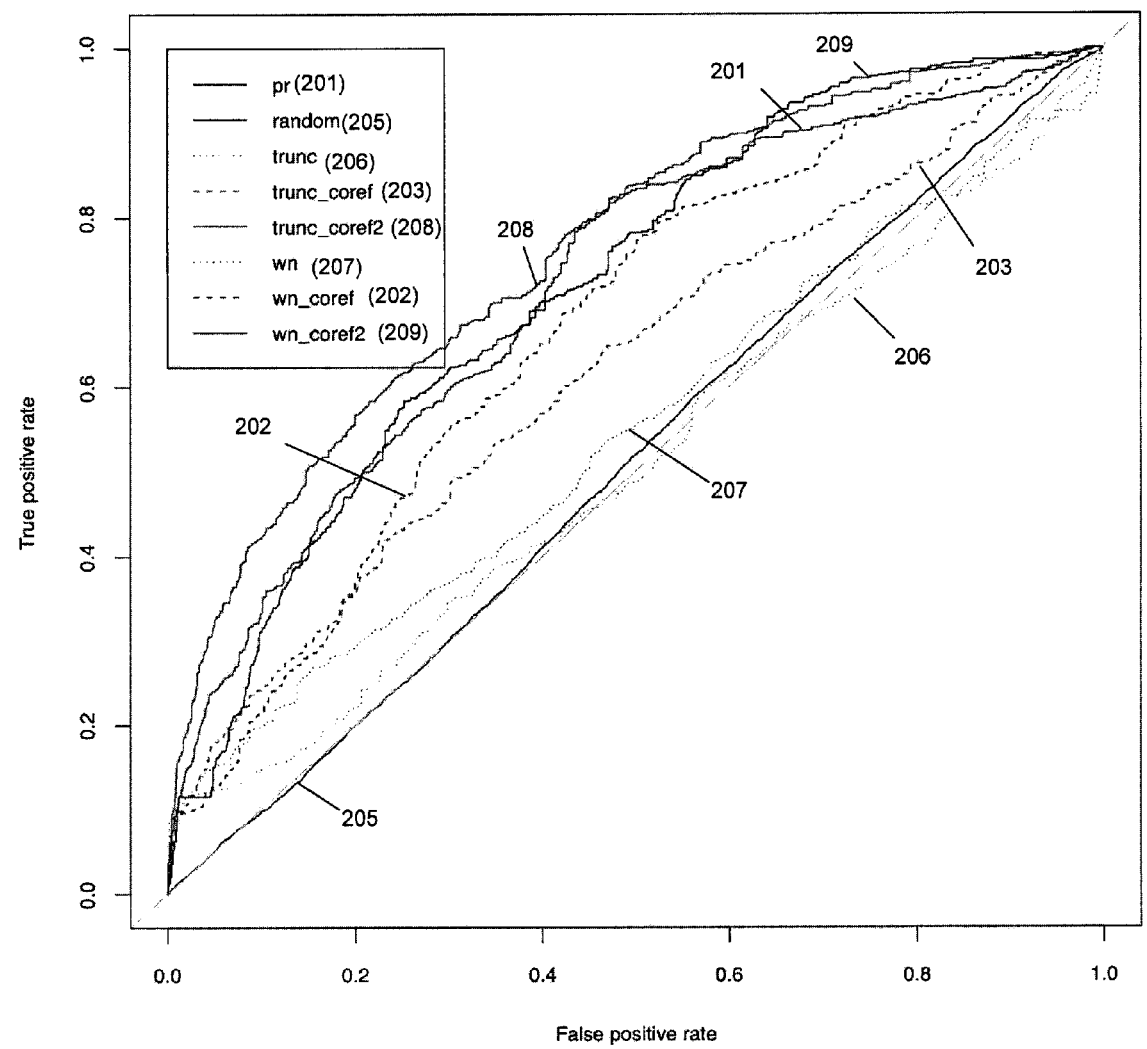
FIG. 2 is a set of receiver operating characteristic curves showing experimental results for various alternative embodiments.

We replicated Experiment 1, this time examining how the addition coreference data described above affected the predictive abilities of the ICA representation in the model. Table 2 below summarizes the results. FIG. 2 is another plot of the ROC curves 201-203 and 205-209 used to calculate the AUC values in Table 2.

| Model name | Description | AUC |
| --- | --- | --- |
| trunc_coref2 | Words truncated to first 4 characters + 2nd-order CoRef | 0.7853 |
| pr | Current implementation (Porter stemming + coreference selection) | 0.7188 |
| wn_coref2 | WordNet normalization + 2nd-order CoRef | 0.7185 |
| wn_coref | WordNet normalization + CoRef | 0.6707 |
| trunc_coref | Words truncated to first 4 characters + CoRef | 0.6206 |
| wn | WordNet normalization only | 0.5462 |
| rand | Random Gaussian values for each product | 0.5114 |
| trunc | Words truncated to first 4 characters only | 0.5084 |

These results demonstrate even further improvement from the incorporation of relational information for word selection.

Figure 3:
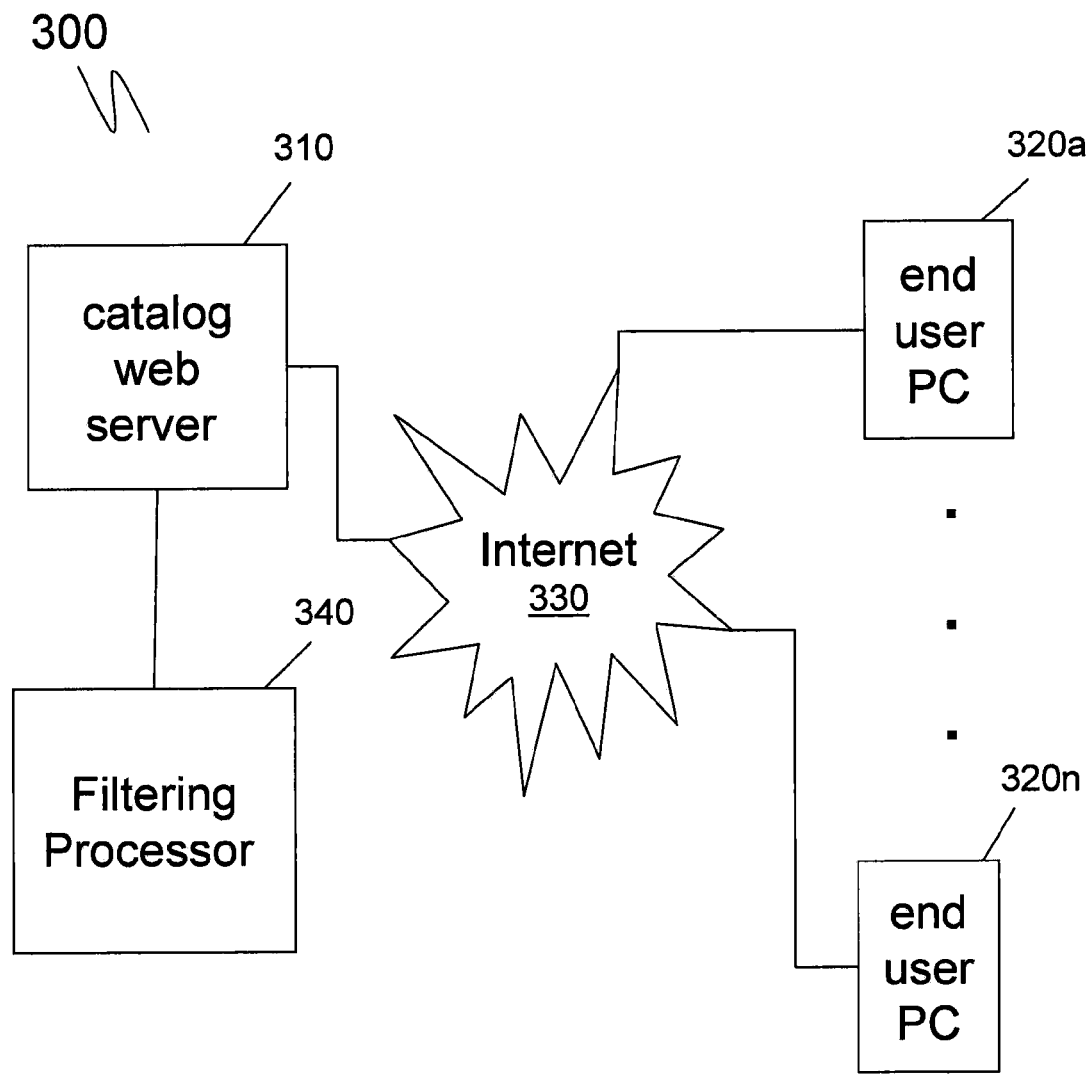
FIG. 3 is a block diagram of a system according for calculating word scores and performing a word selection process according to an embodiment of the invention.

An exemplary system 300 on which the methods described above may be practiced is illustrated in FIG. 3. A web server 310 serves an electronic catalog to a plurality of end user PCs 320a-n via the Internet 330. The web server 310 reports each user session and each product reference (which may be product purchases, product, views or any other type of reference such as placement of the product into a shopping cart) to a filtering processor 340. The filtering processor 340 may be a separate physical device such as a stand alone computer, or may be implemented on the server 310. The filtering processor 340 maintains a coreference (including calculation of coreference weights) and calculates word scores for words in the online catalog served by the web server 310. The scores may be calculated once or may be recalculated from time to time. In some embodiments, the filtering processor 340 simply reports the scores to the web server 310, and the web server 310 uses the scores to select words from the catalog as input to a dimensionality reduction scheme such as ICA and uses the dimensionality reduction results to select products for display to the consumer as suggested additional items in which the consumer may be interested. In other embodiments, the filtering processor 340 itself performs the word selection step based on the word scores and then performs a dimensionality reduction process and recommends one or more products for display with one or more items in the online catalog.

It will be apparent to those of skill in the art that numerous variations in addition to those discussed above are also possible. Therefore, while the invention has been described with respect to certain specific embodiments of methods and devices for performing word selection, it will be appreciated that many modifications and changes may be made by those skilled in the art without departing from the spirit of the invention. It is intended therefore, by the appended claims to cover all such modifications and changes as fall within the true spirit and scope of the invention.

Furthermore, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A computerized method for suggesting a product for purchase comprising the steps of:
    collecting, on a computer, coreference information from a web server serving web pages including a plurality of word groups, each of the word groups comprising a plurality of words, and describing a product in a group of products, the coreference information indicating coreferences in single web sessions of pairs of products in the group of products, the coreference information further indicating a number of a plurality of words across the group of products, a number of occurrences of each word for both coreferenced products of each pair of products, and a number of occurrences of each word for only one coreferenced product of each pair of products;
    calculating, on a computer, a score for each word of the plurality of words occurring in the plurality of word groups using the coreference information;
    selecting, on a computer, a subset of the plurality of words based at least in part on the score;
    performing, on a computer, a dimensionality reduction on the subset; and
    serving a web page from the web server, the web page including a description of a first product and a recommendation for a second product, the recommendation being based on a result from the performing step.

2. The method of claim 1, wherein the coreferences are purchases of the pairs of products.

3. The method of claim 1, wherein the coreferences are views of descriptions of the pairs of products.

4. The method of claim 1, wherein the coreference record is maintained as a plurality of disjoint spanning trees.

5. The method of claim 1, wherein the coreference record is maintained as an N by N array, where N is a number of products.

6. The method of claim 1, wherein the score for a word increases as function of a first component based on a sum across all products of coreference weights corresponding to instances in which the word appears in each of the word groups associated with the pair of products.

7. The method of claim 1, wherein the score for a word decreases as a function of a second component based on a sum across all products of coreference weights corresponding to instances in which the word appears in only one of the word groups associated with the pair of products.

8. The method of claim 1, wherein a score$_i$ for a word i is calculated according to the formula:

$$score_i = C1 * L_i * f_i$$

where
$f_i = \max[0, \sqrt{B_i} * (L_i - C2)]$
$f_i = \max[0, \sqrt{B_i} * (L_i - C2)]$
$L_i = (B_i + \sqrt{N_i} + C3)/(S_i + C4);$ $$I_i = C5 * \sqrt{\frac{p}{1-p}};$$

$p = w_i / n_p;$
$n_p$ is the number of products;
$w_i$ is the number of word groups in which the word i appears;
$B_i$ is the sum across all word groups of coreference weights when the word i appears in the word groups associated with both of the coreferenced products;

$S_i$ is the sum across all word groups of coreference weights when the word i appears in only one of the word groups associated with the coreferenced products; and C1, C2, C3, C4 and C5 are constants.

9. The method of claim 1, wherein the score for a word i is calculated according to the formula:

$$Score = C1 * L_i * I_i * f_i$$

where $f_i = \max[0, \operatorname{Sqrt}[B_i] * (L_i - C2)]$
$Li = (B_i + \sqrt{N_i} + C3)/(Si + C40)$ $$I_i = C5 * \sqrt{\frac{p}{1-p}}$$

$n_p$ is the number of products;

$w_i$ is the number of word groups in which the word i appears;

$B_i$ is the sum across all products of coreference weights when the word i appears in the word groups associated with both of the coreferenced products;

$S_i$ is the sum across all products of coreference weights when the word i appears in only one of the word groups associated with the coreferenced products;

$N_i$ is the geometrical mean coreference weight between a product pair's common neighbors containing word i, and C1, C2, C3, C4 and C5 are constants.

10. A method for selecting a subset of words from a set of word groups associated with a product in a group of products, the method comprising the steps of:

collecting coreference information the coreference information indicating coreferences in single web sessions of pairs of products in the group of products, the coreference information further indicating a number of a plurality of words across the group of products, a number of occurrences of each word for both coreferenced products of each pair of products, and a number of occurrences of each word for only one coreferenced product of each pair of products;

calculating a score for each of the plurality of words in the word groups, the score being based at least in part on a relationship, and the coreference information;

selecting a subset of the plurality of words based on the score;

performing, on a computer, a dimensionality reduction on the subset; and serving a web page from a web server, the web page including a description of a first product and a recommendation for a second product, the recommendation being based on a result from the performing step.

11. The method of claim 10, wherein the relationship is a relationship between a meaning of the words.

12. The method of claim 10, wherein the relationship is a synonym relationship between the meaning of the words.

13. The method of claim 10, wherein each word group is associated with a product, and wherein the relationship is a relationship between the associated products.

14. The method of claim 13, wherein each associated product is a product in a catalog.

15. The method of claim 10, wherein the relationship is community driven.

16. The method of claim 15, wherein the community comprises visitors to an online catalog and wherein the word groups are descriptions of products in the online catalog.

17. A device for selecting a subset of words from a set of word groups, the device comprising:

a memory; and a processor, the processor being configured to perform the steps of collecting coreference information the coreference information indicating coreferences in single web sessions of pairs of products in the group of products, the coreference information further indicating a number of a plurality of words across the group of products, a number of occurrences of each word for both coreferenced products of each pair of products, and a number of occurrences of each word for only one coreferenced product of each pair of products;

calculating a score for each of a plurality of words in the word groups, the score being based at least in part on a relationship, and the coreference information;

selecting a subset of the plurality of words based on the score;

performing a dimensionality reduction on the subset; and serving a web page from a web server, the web page including a description of a first product and a recommendation for a second product, the recommendation being based on a result from the performing step.

18. The device of claim 17, wherein the word groups are descriptions of items in a catalog and wherein the relationship for a particular word is a common reference of two products in the catalog for which corresponding descriptions each contain the particular word.

19. The device of claim 18, wherein the common reference is a common view of the two products.

20. The device of claim 18, wherein the common reference is a common purchase of the two products.

* * * * *